Aug. 27, 1935.  W. G. JOHNSON  2,012,683
VELOCIPEDE
Filed Aug. 21, 1930   2 Sheets-Sheet 1
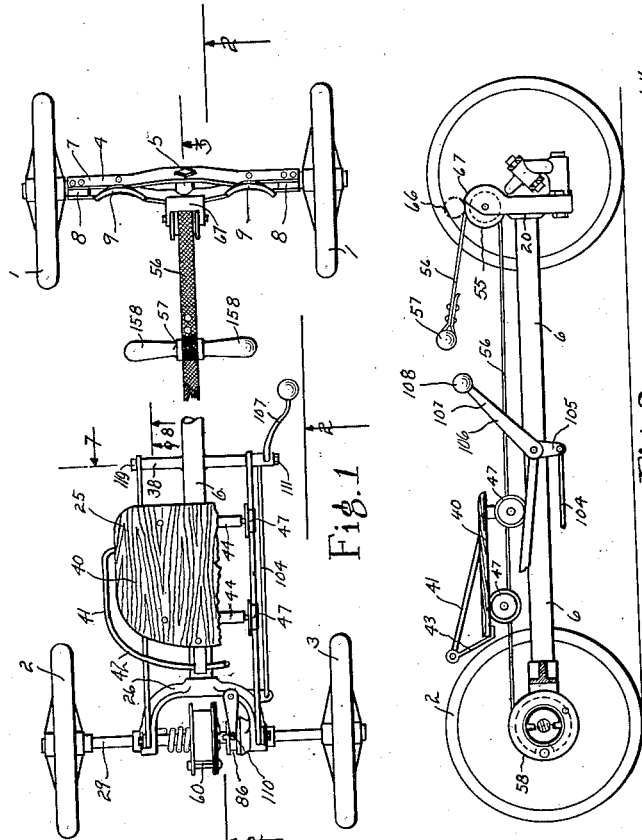
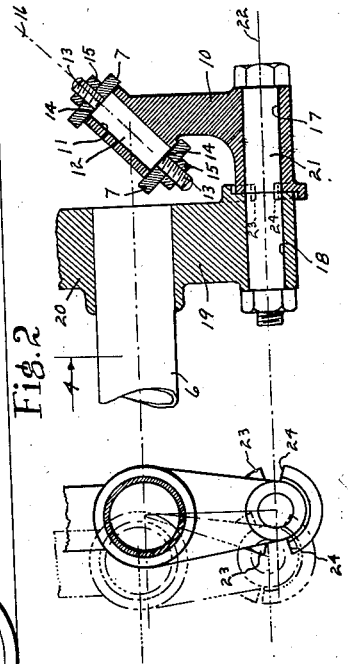
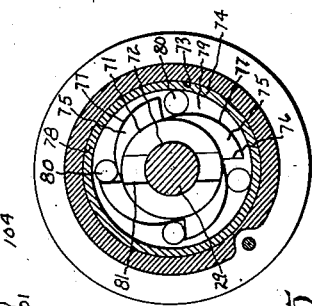
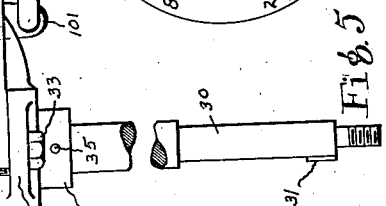
Inventor
Wilfred G. Johnson
By Hough and Canfield
Attorney Aug. 27, 1935.  W. G. JOHNSON  2,012,683
VELOCIPEDE
Filed Aug. 21, 1930  2 Sheets-Sheet 2
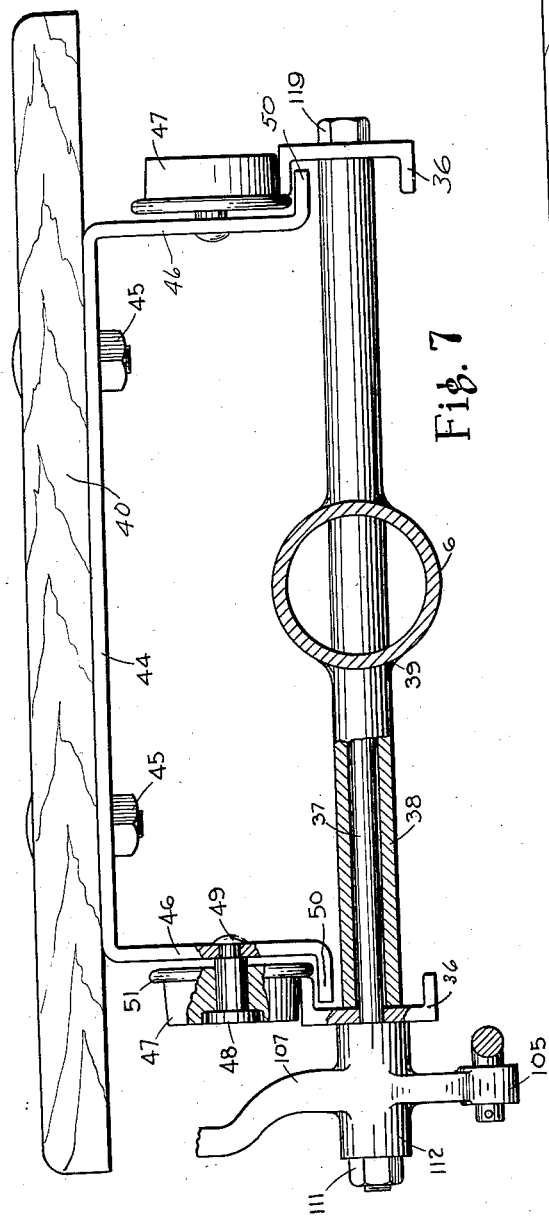
Inventor
Wilfred G. Johnson
By Sloughand Canfield
Attorney Patented Aug. 27, 1935

2,012,683

UNITED STATES PATENT OFFICE 2,012,683

VELOCIPEDE

Wilfred G. Johnson, Elyria, Ohio, assignor to The Colson Company, Elyria, Ohio, a corporation of Ohio Application August 21, 1930, Serial No. 476,738

10 Claims. (Cl. 208—41)

This invention relates to velocipedes, children's vehicles and the like.

It is one of the objects of this invention to provide a velocipede, child's vehicle, racing toy vehicle or the like adapted to be propelled by the rider thereof by movements like or similar to those of rowing a boat or of a rowing machine.

Another object is to provide a velocipede, child's vehicle or the like adapted to be propelled by muscular movements of the arms, legs and back of the rider.

Another object is to provide a velocipede, child's vehicle or the like provided with improved means for steering the same.

Another object is to provide a vehicle of the class referred to provided with a pair of forwardly disposed supporting steering wheels adapted to be steeringly moved by the feet of the rider and tending inherently to take up a normal or straight ahead position.

Another object is to provide a vehicle of the class referred to provided with a seat mounted to move in an improved manner in correspondence with vehicle propelling movements of the rider in an improved manner.

Another object is to provide a vehicle of the class referred to having a pair of supporting driving wheels and provided with improved means for transmitting muscular effort of the operator to the wheels.

Another object is to provide a vehicle of the class referred to having a driving axle and provided with an improved power transmitting clutch for the axle.

Another object is to provide, in a vehicle of the class referred to, an improved clutch device adapted to optionally transmit power to a driving axle of the vehicle or to exert a braking action thereon or to permit the axle to idle in a floating or coasting condition.

Another object is to provide, in a vehicle of the class referred to, a combined brake and power transmitting clutch operable in an improved manner by a single lever conveniently disposed adjacent the rider's seat.

Another object is to provide an improved brake construction for velocipedes, children's vehicles or the like.

Another object is to provide in a velocipede, child's vehicle or the like, an improved power transmitting mechanism for converting muscular effort of the rider into propelling effort of the vehicle.

Another object is to provide a vehicle of the class referred to adapted to be safely driven at high speed in an improved manner by a child or other rider thereon.

Other objects will be apparent to those skilled in the art to which this invention appertains.

My invention is fully disclosed in the following description taken in connection with the accompanying drawings in which:—

Fig. 1 is a top plan view of an embodiment of my invention, with parts thereof broken away;

Fig. 2 is a view taken approximately from the plane 2—2 of Fig. 1, with the left bar 36 removed;

Fig. 3 is a fragmentary cross-sectional view taken approximately from the plane 3 of Fig. 1 and drawn to a larger scale;

Fig. 4 is a partly diagrammatic view taken approximately from the plane 4 of Fig. 3 to illustrate different positions of parts of that figure;

Fig. 5 is a cross-sectional view of a part of Fig. 1 and drawn to a larger scale;

Fig. 6 is a cross-sectional view taken approximately from the plane 6—6 of Fig. 5;

Fig. 7 is a fragmentary sectional view taken approximately from the plane 7 of Fig. 1 and drawn to a larger scale;

Fig. 8 is a fragmentary cross-sectional view taken approximately from the plane 8 of Fig. 1 and drawn to a larger scale;

Fig. 9 is a fragmentary cross-sectional view taken approximately from the plane 9 of Fig. 1 and drawn to a larger scale.

Referring to the drawings, I have shown at 1—1 a pair of vehicle supporting front wheels and at 2 and 3 a pair of rear wheels. The front wheels 1—1 are rotatably mounted on the ends of a front axle 4. The front axle 4 is rotatably connected by a compound swivel bearing, indicated generally at 5, to the forward end of a longitudinally disposed preferably tubular frame member 6. The front axle 4 and its bearing connection with the frame member 6 may be variously constructed but I prefer the following construction. A pair of transverse substantially parallel spaced bars 7 have secured therebetween at their extreme lateral ends, axle supporting blocks 8—8 outwardly from which suitable axles extend to provide rotational bearings for the wheels 1. Inwardly of the blocks 8—8, a pair of foot grips or stirrups 9—9 preferably curved concavely rearwardly are secured to the axle 4 and suitably spaced on opposite sides of the middle portion thereof. At the middle of the axle 4 the bars 7—7 are preferably spread apart to embrace therebetween a swivel head 10 preferably in the form of a casting or forging. The swivel head 10 is provided with a downwardly rearwardly inclined cylindrical bore 11 in which is rotatably mounted an axle king pin 12, provided at its ends with reduced portions 13—13, thus providing a pair of shoulders 14—14, the shoulders 14—14 engaging inner confronting faces of the axle bars 7—7, and the reduced portions 13 being projected through suitable perforations in the bars 7 and being threaded to receive nuts 15—15. The king pin 12 is thus rigidly clamped, by the nuts 15, between the bars 7 and the front axle 4 and is thus rotatably mounted in the head 10, the axis of rotation 16 being downwardly rearwardly inclined.

The swivel head 10 is also provided with a horizontally disposed cylindrical bore 17 disposed below the bore 11 and axially aligned and registering with a cylindrical bore 18 in the hanger portion 19 of a head 20 rigidly connected to the forward end of the frame member 6. The head 20 is preferably a casting or forging. A swivel bolt 21 extends through the bores 17 and 18 and provides a rotational bearing for the swivel head 10 on the head 20 about the axis 22 of the bores 17 and 18. The swivel head 10 and the head 20 at the adjacent confronting terminations of the bores 17 and 18, are provided with stops for limiting the rotational movement of the swivel head 10 with respect to the head 20 around the axis 22. As shown in Figs. 3 and 4, the head 20 has formed thereon a pair of similar stops 23—23 horizontally aligned and disposed above the axis 22, and the head 10 has a corresponding pair of stops 24—24 normally horizontally aligned and below the axis 22, and in a transverse vertical plane with the stops 23. It will therefore be apparent that rotation of the swivel head 10 around the axis 22 in either direction will engage one or the other of the stops 24 with the stops 23 to limit said rotational movement.

By the foregoing construction, it will be seen that the axle 4 may have rotational bearing around the axis 16 and the axis 22 concurrently and may therefore taken up the normal position shown in Fig. 1 in which the wheels 1 and 2 are directed straight ahead for straight ahead movement of the vehicle or may take up rotated positions clockwise or counter-clockwise of said normal position to lead or steer the vehicle ahead to the right or to the left. The axle 4 may be moved to said steering positions by the feet of the rider in the stirrups 9, the rider sitting upon a seat truck 25, to be more fully described, and pushing with his feet upon one or the other of the stirrups 9.

It will be observed however that the distance from the ground to the king pin 12 is fixed, due to the fixed radial dimension of the wheels 1—1 and therefore rotation of the swivel head 10 with respect to the swivel pin 21, about the axis 22, is necessarily accompanied by elevation of the bolt 21, head 20 and the forward end of the frame element 6. As will be more fully referred to later, the weight of the rider on the seat truck 25 is transmitted to the frame element 6 and therefore the said elevating movement of the frame element 6 is opposed by the weight of the rider as well as by its own weight, and that of other parts of the device to be described carried by or supported upon the frame element 6. Therefore, as will now be clear, the weight of the rider and of parts of the device transmitted to the frame element 6, acts conversely to oppose movement of the axle 4 and wheels 1 toward clockwise or counter-clockwise directional positions and exerts force tending to return the wheels and axle to the straight ahead or normal position illustrated.

Thus the forward wheels 1—1 tend at all times to occupy or return to the straight ahead steering position illustrated rendering the forward progress of the vehicle certain and safe and at the same time however permitting steering therefrom of to the right or to the left by relatively slight pressure from the feet of the operator on one or the other of the stirrups 9.

The rearward end of the tubular longitudinal frame element 6 is rigidly secured in a head 26 provided with a pair of rearwardly projecting laterally diverging arms 27 and 28 terminating rearwardly in bearing housings 28—28. A rear axle 29 is rotatably mounted in suitable bearings such as ball bearings in the bearing housings 28. On the ends of the axle 29, rear wheels 2 and 3 are mounted, the wheel 2 preferably being mounted to rotate on the axle by any known or suitable type of bearing, and the wheel 3 is preferably keyed upon the axle 29, on a suitable portion 30 thereof, Fig. 5, by means of a key of any known or suitable construction, one type of which is indicated generally at 31. Means to be described is provided to rotate the axle 29 and drive the rear wheel 3 to propel the vehicle and the rotational mounting of the wheel 2 on the axle permits the vehicle to be driven on a curvilinear path, as will be understood.

Preferably the axle 29 is elongated beyond the bearing housings 28—28 to give stable width of tread to the vehicle, and the axle 29 may be prevented from shifting longitudinally in the bearing housings 28 by collars 34—34 secured on the axle as by pins 35—35 outwardly of the bearing housings 28, and engaging the bearing elements within the housings.

As will appear from the foregoing, the rearward end of the frame element 6 is supported by the rear axle 29. The bearing housings 28 are each provided with an upstanding lug 32—32 to which is bolted as at 33—33 the rear end portions of a pair of longitudinally disposed channel-form rails 36—36.

The rails 36 are downwardly forwardly inclined and the forward ends thereof are supported on a transverse through-bolt 37 projected through suitable perforations in the forward end portions of the rails 36 and axially through a tubular transverse spacer 38 surrounding the bolt 37, abutting at its ends upon confronting surfaces of the rails 36 and extending through suitable perforations in the wall of the tubular frame element 6. The spacer 38 is preferably welded to the tubular element 6 at its intersection therewith as at 39.

The through-bolt 37 extends through and beyond one of the rails 36 to provide a rotational bearing for a lever 107 to be described, and the longitudinal position of the through-bolt 37 is prevented from shifting longitudinally by a head 119 on one end engaging the adjacent rail 36 and a nut 111 on the other end engaging a hub-portion 112 of the lever 107 thereon.

The seat truck 25 above referred to is mounted to be reciprocable forwardly and rearwardly of the vehicle on the rails 36 by the following construction. The seat truck 25 preferably comprises a chair seat or bottom 40 having arms 41 and a back 42 formed integrally from a piece of round bar stock, the forward ends of the arms 41 being secured to the seat bottom 40 laterally thereof in any suitable manner and the back portion 42 being supported by a back brace 43 connected to the back piece and to the seat bottom 40. A pair of truck frame elements 44—44 formed from flat bar stock are secured to the underside of the seat 40 transversely thereof in any suitable manner as by bolts 45 and comprise each a pair of depending hangers 46 having mounted thereon for rotation on horizontal axes, flanged wheels 47, the rotational bearing therefor comprising a stud or stub shaft 48 riveted to the hangers 46, as at 49. The lower ends of the hangers 46 are bent outwardly laterally as at 50 to provide hook portions projecting under the inwardly directed flange of the channel-form rails 36. The wheels 47 are so disposed as to roll upon the upper flange of the rails.

By this construction it will now appear that the seat truck 25 may roll forwardly and rearwardly on the rails 36, and due to the inclined disposition of the rails, tends to roll forwardly by gravity. The seat truck 25 is prevented from leaving the rails vertically by the hook portions 50 of the hangers 46 engaging the rail flange; and the flanges 51 of the wheels 47 prevent the seat truck 25 from leaving the rails laterally. Furthermore, the seat truck 25 is prevented from leaving the rails at the rearward ends thereof by the engagement of the hook portions 50 with the bolts 33, as shown in Fig. 8, and from leaving the rails forwardly by the engagement of the hook portions 50 with the spacer 38, as shown in Fig. 9.

The head 20 on the forward end of the frame element 6 has mounted thereon above the frame element 6 a flanged pulley 55 rotatable on a horizontal transverse axis. A transversely disposed handle bar 57 having on its opposite ends a pair of hand grips 158, has secured to its middle portion a strap 56 of fabric material, leather or the like which is looped over the upper portion of the pulley 55, downwardly around the same and extended rearwardly above the frame element 6 and under the seat truck 25 and over the rear axle 29, and the rearward end thereof is wound on a drum 58 provided with retaining flanges 59—59, the extreme end of the strap 56 being anchored to the drum by a bolt 60 projected through suitable perforations in the flanges 59.

In Fig. 1, the strap 56 is broken away and completely removed from the drum for clearness and in Fig. 5, the drum is shown with several layers of the strap wound thereon.

The drum 58 is disposed coaxially of the axle 29, and is provided with a hub member 61 extending laterally therefrom and surrounding the shaft 29, the end of the hub being provided with a cylindrical coaxial bearing portion 62 fitting the shaft 29 and abutting upon the bearing housing 28 or upon the bearing element therewithin. A helical spring 63 is coiled around the hub 61 and has one end thereof anchored in the drum 58 as at 64 and the other end anchored as at 65 in the bearing housing 28, or in the arm 27. In a manner to be referred to later, when the handle bar 57 is pulled upon rearwardly, the strap 56 will turn the drum 58 clockwise, as viewed in Fig. 2, and wind up the spring 63 and upon releasing the pull on the handle 57, the spring 63 will turn the drum in the opposite direction and pull the handle bar 57 forwardly. The handle bar 57 thus normally is pulled forwardly until it takes up a normal position indicated in broken lines at 66, Fig. 2, where its movement is stopped by engagement with an upper portion 67 of the head 20 shrouding the upper forward portion of the pulley 55.

The drum 58 on the axial end thereof opposite the hub 61 is provided with a cap 68 which may be secured thereon as by screws 69. The cap is axially bored to provide a cylindrical bearing bore 70 in which is rotatably mounted the hub 71 of a ratchet mechanism to be described, the hub 71 in turn being bored as at 72 to provide a rotational bearing therefor on the axle 29. The axle 29 thus rotatably supports the hub 71 and the hub 71 rotatably supports the drum 58 on one end, the other end being supported at 62 as described above.

The drum 58 has a cylindrical recess 73 formed therein coaxial with the axle 29 in which is press-fitted a cup-like element 74 comprising a skirt portion 78. The hub 71, inwardly of the cap 68 has thereon, preferably formed integrally therewith a plurality such as four radially extending lugs 75. The lugs 75 have radial faces 76 and externally convex portions 77 eccentric with respect to the skirt 78 of the cup 74 thus providing between the lugs 75 and the skirt 78 of the cup wedge-formed curvilinear spaces 79 in which are disposed and trapped balls or rollers 80.

By reference to Fig. 6, it will be seen that if the hub 71 and lugs 75 are held against rotation and if the skirt 78 of the cup 74 is rotated clockwise, the rollers 80 will be rolled clockwise into wedging engagement between the curved portions 77 of the lugs 75 and the skirt 78, causing the hub 71 to be gripped and rotated with the skirt 78 and that when the skirt 78 is rotated in the counter-clockwise direction, the rollers 80 will be rolled counter-clockwise into the radially wider portions of the wedge-shaped spaces 79 and into engagement with the radial faces 76 of the lugs, and the grip or lock between the hub 71 and the skirt 78 will be broken and the skirt may turn freely with respect to the hub 71.

It will thus be apparent that the alternate clockwise and counter-clockwise rotation of the drum 58 by rearward and forward movement of the handle bar 57 will communicate successive clockwise rotational impulses to the hub 71. The parts just described and illustrated separately in Fig. 6 constitute a silent non-clicking free running ratchet.

The axial outer end of the hub 71 is provided with a plurality such as two clutch recesses 81, and adapted to be clutchingly engaged by corresponding clutch teeth 82 on a clutch device 83, now to be described. The clutch device 83 comprises a spool 84 mounted on the axle 29 and keyed thereon by a feather key 85 by which it is locked to rotate with the axle but is longitudinally shiftable thereon. The spool portion 84 is provided with an angular groove 86 by which it may be shifted in a manner to be described. Axially opposite the spool portion, the clutch device is formed with a conical periphery on which is mounted a conically shaped clutch liner 87 of leather or like suitable material adapted to frictionally engage a corresponding mating female conically formed clutch surface 88 formed on the adjacent bearing housing 28. The clutch device 83 thus constructed may be shifted axially to engage the teeth 82 with the recess 81, and in this position the rotational impulses given to the hub 71 may be transmitted through the clutch device and key 85 to the axle 29 to turn it; or the clutch device may be shifted in the direction to engage the clutch liner 87 and clutch surface 88 to exert a braking action therebetween to stop rotation of the shaft 29; or the clutch device may be shifted to an intermediate neutral position. The clutch device may be retained in any one of said three shifted positions by a centering device comprising a ball 89 disposed in a radial bore 90 in the clutch device 83 engaging notches 91, 92 and 93 in the feather key 85 corresponding to the said three positions, the ball 89 being resiliently pressed into the notches by a spring 94 retained in the bore 90 by a plug 95 in a well known manner, the plug 95 being driven or screw-threaded into the bore 90, as may be desired.

To shift the clutch device from one position to the other, I provide a bell crank 100 having a transverse arm 101 and a longitudinal arm 102 and mounted for oscillation about a vertical axis 103 on the frame arm 28. The arm 102 of the bell crank has a pin 110 projecting into the annular groove 86 of the clutch device and the arm 101 is connected by a rod 104 to a short arm 105 of the operating lever 107 above referred to, fulcrumed on the through-bolt 37 by a hub 112 having rotational bearing on the bolt 37. An upstanding long arm 106 of the lever 107 is disposed laterally of the seat truck 25 and provided with a handle 108 adjacent thereto. Upon forward movement of the handle 108, the bell crank 100 will be rocked clockwise, as viewed in Fig. 5, and will project the teeth 82 into the recess 81 for propelling the vehicle forwardly. On moving the handle 108 rearwardly, the clutch device will be correspondingly moved to the braking position, and at an intermediate position of the handle 108, the clutch device will be moved to its neutral or idling position. The braking effect may be varied by varying the pull on the handle 108 of the lever 107.

In the operation of my invention, the driver or operator sits upon the seat truck 25 and places his feet in the stirrups 9—9 and grasps with his hands the handle grips 58. To propel the vehicle forwardly, after engaging the clutch by forward movement of the lever 107, the operator leans forwardly permitting the handle bar 57 to be pulled forwardly by the tension in the strap 56 caused by the unwinding of the spring 63 on the drum 58. At the same time, by bending his knees, the seat truck 25 rolls down the inclined rails 36 to or adjacent to its forward position.

He then leans backward, pulling on the handle bar 57 and through the strap 56, giving a propelling rotational impulse to the axle 29 through the drum 58 and clutch device 83, at the same time winding up the spring 63; and this movement is amplified and the force thereof increased by concurrently pushing with his feet on the stirrups 9 and straightening out his legs, the seat truck 25 at the same time rolling rearwardly on the rails 36. Muscular forces of his back, legs and arms are thus jointly coordinated into a single propelling effort. These movements are repeated, the movements being similar to those of rowing a boat, or of operating the well known rowing machine.

The forward motion of the vehicle may be steered by the operator's feet in the manner hereinbefore described. The forward movement of the vehicle may continue after the operator has ceased propelling it by means of the ratcheting device above described, permitting the axle 29 to rotate within the drum 58. The vehicle may be stopped by the operator by pulling rearwardly on the lever 107 to apply the brake. The vehicle may be moved backwardly after moving the lever 107 to the neutral position, with the operator on the seat and by placing his feet on the ground and pushing the vehicle backward.

The vehicle of my invention may be propelled at great speed and provides an unexcelled device for the muscular development of the body and admits of being constructed in a vehicle of pleasing appearance.

The double bearing or swivel mounting of the front axle, besides functioning to return the front wheels to the straight ahead position, also provides the maximum of clearance between the legs of the rider and the front wheels when his feet are on the stirrups 9. Steering the vehicle toward one side tends to move one wheel or the other closer to his leg but by the swivel bearing construction described, the same movement is accompanied by a lateral shifting of the adjacent wheel in the direction away from his leg so that for a given length of the front axle, the front wheels may be turned through a greater steering angle without danger of frictionally engaging the rider's leg than would be possible with the usual single vertical king pin or fifth wheel type of front axle construction.

Furthermore, the stops 23 and 24 described above in connection with Figs. 3 and 4 limit the directional pivoting movement of the front axle to avoid actual contact of the front wheels with the legs of the rider when steering the vehicle.

My invention is not limited to the exact details of construction shown and described. Many changes therein and modifications thereof may be made without departing from the spirit of my invention or sacrificing its advantages.

I claim:

1. In a velocipede or the like, a frame, a plurality of supporting ground wheels therefor, a seat on the frame, a handle disposed forwardly of the seat and adapted to be moved forwardly and rearwardly, a driving axle for one of the wheels, a drum on the axle, a clutch between the drum and the axle for transmitting rotational movement to the axle from rotational movement of the drum in one direction of rotation only and a flexible element wound on the drum and secured to the handle and adapted to rotate the drum in said direction when the handle is moved, the clutch comprising a clutch element movable longitudinally of the axle to operatively engage and disengage the drum with the axle, and spring means interconnecting the drum and frame windable upon rotational driving movement of the drum and unwindable to rotate the drum in a non-driving direction.

2. In a velocipede or the like, a frame, a plurality of supporting ground wheels therefor, a seat on the frame, a handle disposed forwardly of the seat and adapted to be moved forwardly and rearwardly, a driving axle for one of the wheels, a drum on the axle, a clutch between the drum and the axle for transmitting rotational movement to the axle from rotational movement of the drum in one direction of rotation only, a linear flexible element wound on the drum at one end and connected to the handle at the other end and adapted to rotate the drum in said direction when the handle is moved rearwardly, and means for rotating the drum in the other direction when the handle is moved forwardly, the clutch comprising a clutch element movable longitudinally of the axle to disengage the drum from the axle and to permit the axle to be turned by movement of the velocipede rearwardly without turning the drum.

3. In a velocipede or the like, a frame, a plurality of supporting ground wheels therefor, a seat on the frame, a handle disposed forwardly of the seat and adapted to be moved forwardly and rearwardly, a driving axle for one of the wheels, a drum on the axle, a clutch between the drum and the axle for transmitting rotational movement to the axle from rotational movement of the drum in one direction of rotation only, a linear flexible element wound on the drum at one end and connected to the handle at the other end and adapted to rotate the drum in said direction when the handle is moved rearwardly, means for rotating the drum in the other direction when the handle is moved forwardly, the clutch comprising a clutch element movable to disengage the drum from the axle to permit the axle to be turned by movement of the velocipede rearwardly without turning the drum, and comprising a brake element movable to frictionally engage the axle with a stationary portion of the frame.

4. In a velocipede or the like, a frame, a plurality of supporting ground wheels therefor, a seat on the frame, a handle disposed forwardly of the seat and adapted to be moved forwardly and rearwardly, a driving axle for one of the wheels, a drum on the axle, a clutch between the drum and the axle for transmitting rotational movement to the axle from rotational movement of the drum in one direction of rotation only, a linear flexible element wound on the drum at one end and connected to the handle at the other end and adapted to rotate the drum in said direction when the handle is moved rearwardly, means for rotating the drum in the other direction when the handle is moved forwardly, the said seat being provided with an anti-friction support on a forwardly downwardly inclined trackway, and a foot perch on the frame forwardly of the seat whereby the seat may be moved forwardly and rearwardly by the rider in correspondence with forward and rearward movements of the handle, and means selectively maintaining the clutch in longitudinally spaced operative and non-operative positions along the axle, said means being rendered inoperable by force above a predetermined amount directed axially of the axle.

5. In a vehicle, a driving axle, a rotary oscillatable element on the driving axle, spring means for normally rotating it in one direction, power applying means for periodically oscillating it in the other direction, a clutch element adapted to be rotated by rotation of the said oscillatable element in one direction only, and means for engaging and dis-engaging the clutch element with the shaft, to permit rearward movement of the vehicle without rotating the oscillating element, and means engageable with the clutch for maintaining the clutch in a selected relation with the shaft.

6. In a velocipede or the like, a frame, a plurality of supporting wheels, a driving axle for one of the wheels, an oscillatory drum on the axle, clutch means between the drum and the axle whereby oscillatory rotation of the drum in one direction may drive the axle, resilient means for oscillating the drum in the return direction, a flexible element wound on the drum and extending tangentially therefrom and joined to a handle, a seat on the frame, a foot perch on the frame forwardly of the seat whereby a rider on the seat may pull on the handle and rotate the drum by unwinding the element therefrom to propel the vehicle forwardly and upon releasing the handle, the drum will rotate in the other direction and wind up the element thereon, the clutch means comprising a clutch element movable longitudinally of the axle to disengage the drum from the axle, and comprising a brake element on the clutch element engageable with a stationary brake portion of the frame by continuous longitudinal movement of the clutch element, the clutch element adapted to take up a mid-position to permit the axle to be turned backwardly by rearward movement of the velocipede without turning the drum, and a lever to operate the clutch element disposed adjacent the seat.

7. In a vehicle, a frame, a driving axle rotatably mounted on the frame, an oscillatable driving element on the axle, power means for oscillating the driving element, a clutch element on the axle, a ratchet device between the driving element and the clutch element for rotating the clutch element upon rotation of the driving element in one direction, a reciprocable device splined on the axle and provided with a clutch portion engageable with the first-mentioned clutch element when longitudinally moved on the axle in one direction, a brake portion associated with the reciprocable device and a brake element on the frame engageable thereby upon movement of the reciprocable device in the other direction, and means for maintaining the reciprocable device in engagement with the clutch element or the frame brake element rendered inoperable by a predetermined force directed longitudinally of the axle.

8. In a velocipede or the like, a frame, a plurality of supporting ground wheels therefor, a seat on the frame, a handle disposed forwardly of the seat and adapted to be moved forwardly and rearwardly by a rider on the seat, a driving axle for one of the wheels, a driving element associated with the axle and a connection between the driving element and the handle for transmitting forward and rearward movement of the handle to rotary movement of the driving element, a clutch element drivingly connected to the driving axle, operable means for moving the clutch element to engage the rotary element to connect it to the axle, and for moving the clutch element to disengage the rotary element to permit the axle to be turned independently of the rotary element, and to move the clutch element into frictional engagement with a portion of the frame to effect a braking action, and means disengageable by a predetermined force on the operable means for maintaining the clutch element in an axle engaged, axle disengaged, or axle braking position.

9. In a velocipede or the like, a frame, a plurality of supporting ground wheels therefor, a seat on the frame, a handle disposed forwardly of the seat and adapted to be moved forwardly and rearwardly, a driving axle for one of the wheels, a drum on the axle, a clutch between the drum and the axle for transmitting rotational movement to the axle from rotational movement of the drum in one direction of rotation only and a flexible element wound on the drum and secured to the handle and adapted to rotate the drum in said direction when the handle is moved rearwardly, the clutch comprising a clutch element movable longitudinally of the axle to disengage the drum from the axle and comprising a brake element movable longitudinally of the axle to frictionally engage the axle with a stationary portion of the frame, and means maintaining the clutch in an engaged, disengaged, or brake position, said means being rendered inoperable by a force directed axially of the clutch above a predetermined amount.

10. In a velocipede or the like, a frame, a plurality of supporting ground wheels therefor, a seat on the frame, a handle disposed forwardly of the seat and adapted to be moved forwardly and rearwardly, a driving axle for one of the wheels, a drum on the axle, a clutch between the drum and the axle for transmitting rotational movement to the axle from rotational movement of the drum in one direction of rotation only, a linear flexible element wound on the drum at one end and connected to the handle at the other end and adapted to rotate the drum in said direction when the handle is moved rearwardly, and means for rotating the drum in the other direction when the handle is moved forwardly, the clutch comprising a combined clutch and brake element movable longitudinally of the axle to disengage the drum from the axle and to engage the axle with a stationary portion of the frame, and an operating lever for the clutch element disposed adjacent the seat for moving the clutch element, and means rendered inoperable by a predetermined force on the operating lever for maintaining the clutch in a drum engaged, drum disengaged, or frame engaged position.

WILFRED G. JOHNSON.